US008559665B2

(12) United States Patent
Schmidt et al.

(10) Patent No.: US 8,559,665 B2
(45) Date of Patent: Oct. 15, 2013

(54) HEADSET AND HEADPHONE

(75) Inventors: Axel Schmidt, Winsen (DE); Jan Peter Kuhtz, Celle (DE); Olaf Leske, Langenhagen (DE); Olav Nisse, Hildesheim (DE); Christian Grone, Neustadt (DE); Hatem Foudhaili, Hannover (DE); Martin Streitenberger, Hannover (DE); Irene Strueber, Hannover (DE)

(73) Assignee: Sennheiser electronic GmbH & Co. KG, Wedemark (DE)

( * ) Notice: Subject to any disclaimer, the term of this patent is extended or adjusted under 35 U.S.C. 154(b) by 94 days.

(21) Appl. No.: 13/020,629

(22) Filed: Feb. 3, 2011

(65) Prior Publication Data
US 2011/0194721 A1 Aug. 11, 2011

(30) Foreign Application Priority Data
Feb. 4, 2010 (DE) .......................... 10 2010 006 927

(51) Int. Cl.
*H04R 25/00* (2006.01)
(52) U.S. Cl.
USPC ............ 381/374; 381/370; 381/371; 381/378
(58) Field of Classification Search
USPC .......... 381/370–371, 374–375, 377–380, 383
See application file for complete search history.

(56) References Cited

U.S. PATENT DOCUMENTS

| | | | | |
|---|---|---|---|---|
| 1,133,833 A | * | 3/1915 | Adams-Randall | 381/378 |
| 1,148,941 A | * | 8/1915 | Wier | 381/378 |
| 1,483,315 A | * | 2/1924 | Saal | 381/378 |
| 1,583,088 A | * | 5/1926 | Murdock | 381/377 |
| 1,592,978 A | * | 7/1926 | Kaisling, Jr. | 381/378 |
| 5,185,807 A | * | 2/1993 | Bergin et al. | 381/378 |
| 6,295,366 B1 | * | 9/2001 | Haller et al. | 381/374 |
| 2007/0269073 A1 | | 11/2007 | Huang | |
| 2008/0226090 A1 | | 9/2008 | Seto | |

FOREIGN PATENT DOCUMENTS

DE 4423945 A1 12/1995
GB 223043 A 10/1924

OTHER PUBLICATIONS

The German Search Report, in German, for Application No. DE 10 2010 006 927.2, dated Feb. 18, 2010, 4 pages.

* cited by examiner

*Primary Examiner* — Suhan Ni
(74) *Attorney, Agent, or Firm* — Kilpatrick Townsend & Stockton LLP

(57) ABSTRACT

There is provided a headset having a head band, at least one fork for receiving an earpiece and a receiving portion between an end of the head band and one of the forks. The fork is arranged pivotably about a pivot axis. The fork has a first end having a support element. The receiving portion has a slider having at least two receiving positions. The support element engages into one of the at least two receiving positions of the slider and thus limits the maximum deflection of the fork about the pivot axis.

9 Claims, 12 Drawing Sheets

HEADSET AND HEADPHONE

CROSS-REFERENCE TO RELATED APPLICATIONS

Figure 1:
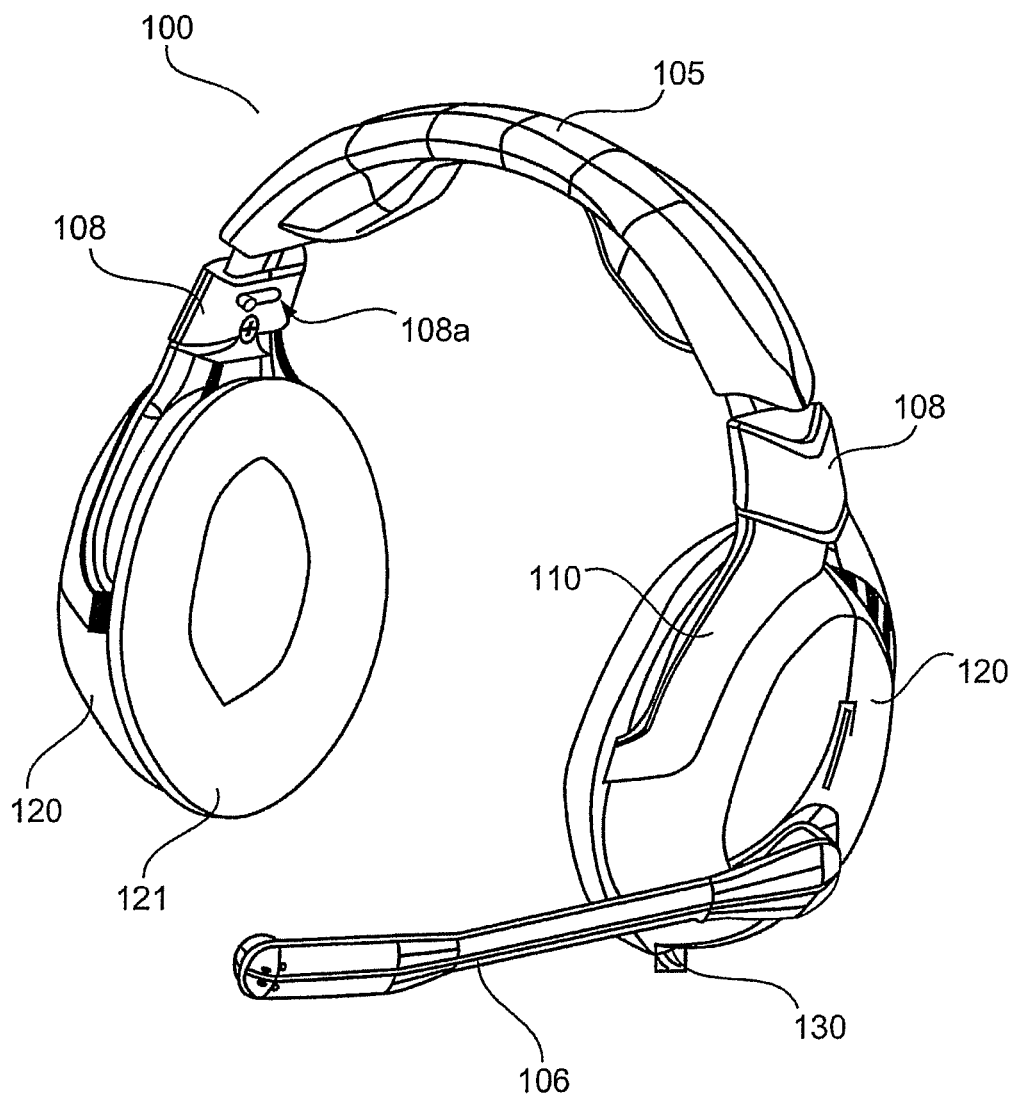

The present application claims priority to German Patent Application No. 10 2010 006 927.2, filed Feb. 4, 2010, the entire contents of which are incorporated by reference in its entirety for all purposes.

The present invention concerns a headset and an earphone.

Headsets and earphones are known in many different forms.

As documents in the state of the art attention is directed to DE 44 23 945 A1, GB 223 043 A, US 2008/0226090 A1 and US 2007/0269073 A1.

An object of the present invention is to provide an improved headset and an improved earphone.

That object is attained by a headset as set forth in claim 1 and an earphone as set forth in claim 5.

Thus there is provided a headset having a head band, at least one fork for receiving an earpiece and a receiving portion between an end of the head band and one of the forks. The fork is arranged pivotably about a pivot axis. The fork has a first end having a support element. The receiving portion has a slider having at least two receiving positions. The support element engages into one of the at least two receiving positions of the slider and thus limits the maximum deflection of the fork about the pivot axis.

In accordance with an aspect of the present invention the support element is fixedly connected to the fork.

In a further aspect of the present invention the at least two receiving positions of the slider delimit different maximum deflections of the fork.

In a further aspect of the present invention the slider projects at least partially out of the receiving portion.

The invention also concerns a headphone having a head band, at least one fork for receiving an earpiece and a receiving portion between an end of the head band and one of the forks. The fork is arranged pivotably about a pivot axis. The fork has a first end having a support element. The receiving portion has a slider having at least two receiving positions. The support element engages into one of the at least two receiving positions of the slider and thus limits the maximum deflection of the fork about the pivot axis.

The invention also concerns a headset having an earpiece. The earpiece has at least one electroacoustic reproduction transducer, a microphone and a cover element for screening the microphone from useful sound produced by the electroacoustic reproduction transducer. The cover element is at least partially provided between the electroacoustic reproduction transducer and the microphone.

In a further aspect of the present invention the fork has a first and a second end, wherein a locking member is provided at the second end of the fork. In the region of the pivot axis the earpiece has a support for receiving the locking member. In a first operative position the locking member at the second end of the fork does not engage into the support. In a second operative position the locking member engages into the support and the fork is locked to the earpiece.

In a further aspect of the invention the earpiece has a receiving portion for receiving a microphone. The microphone is fixed in the receiving portion by means of a capsule mounting. The capsule mounting has an elastic material so that the microphone is provided in the receiving unit in structure-borne sound-decoupled relationship.

In a further aspect of the present invention the slider is arranged transversely and can be operated from the interior of the head band. In other words the slider is of a transverse configuration and is provided in the internal region of the head band.

The invention also concerns an earphone or a headset having a head band and at least one fork at the end of the head band. A first end of the fork is fixed to the head band. A second end of the fork is connected pivotably to an earpiece by way of a pivotal mounting. A locking member is provided at the second end of the fork. In the region of the pivot axis the earpiece has a support for receiving the locking member. In a first operative position there is an angle of $>\gamma$ between the earpiece and the fork. In that situation the locking member does not engage into the support. In a second operative situation there is an angle of $<\gamma$ between the earpiece and the fork so that the locking member engages into the support and locks the fork to the earpiece. That angle can be between 5° and 80°.

The invention also concerns an earphone or a headset having at least one earpiece for receiving an electroacoustic reproduction transducer. The earpiece has a receiving portion for receiving a microphone. The microphone is fixed in the receiving portion by means of a capsule mounting. The capsule mounting of the microphone has an elastic material so that the microphone is provided in the receiving unit in structure-borne sound-decoupled relationship. Optionally therefore the microphone projects at least partially into the internal region of the earpiece and can be used for recording interference sound in the interior of the earpiece. As an alternative thereto the microphone can also be so arranged that as an external microphone it detects the external noises. Optionally the receiving portion has at least one opening, wherein the opening is coupled to the external volume outside the earpiece. Optionally the at least one opening can end in a volume which in turn is coupled to the external volume by way of an opening.

The invention also concerns an earphone or an headset having an earpiece and a receiving region for receiving a cable in the earpiece. The cable has a cable bushing or sleeve. The cable bushing has an at least partially peripherally extending sealing cone and/or at least partially peripherally extending ribs. The receiving portion has an opening having a constriction.

The invention also concerns an earphone or a headset having at least one fork and at least one earpiece, wherein the earpiece is fixed to the fork pivotably about a pivot axis, wherein the earpiece has a first portion of a first length and a second portion of a second length, wherein the position of the pivot axis divides the earpiece into the first and second portions. The length of the first portion is greater than the length of the second portion.

The invention also concerns a headset or an earphone having at least one earpiece for receiving an electroacoustic reproduction transducer and an ear pad. The earpiece can have a receiving element for example for receiving an electroacoustic reproduction transducer, wherein the receiving element has an at least partially peripherally extending projection. The ear pad has an at least partially peripherally extending turned-over edge. In that respect the turned-over edge is of such a configuration that it can receive the projection. Provided at the turned-over edge is at least one insertion aid for simplifying insertion of the projection. The insertion aid is preferably made from a firm material. Optionally, a recess can be provided on the projection for receiving the insertion aid.

Further configurations of the invention are subject-matter of the appendant claims.

Advantages and embodiments by way of example of the invention are described hereinafter with reference to the drawings.

Figure 2:
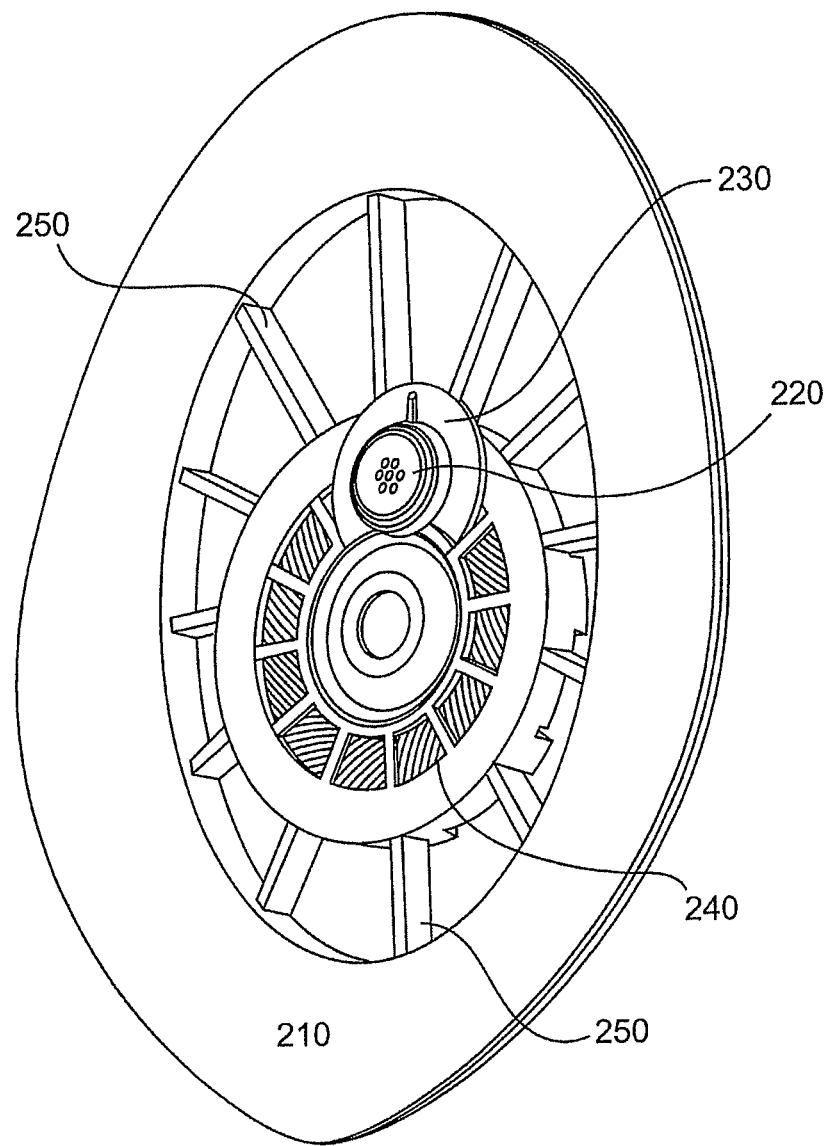
Figure 3A:
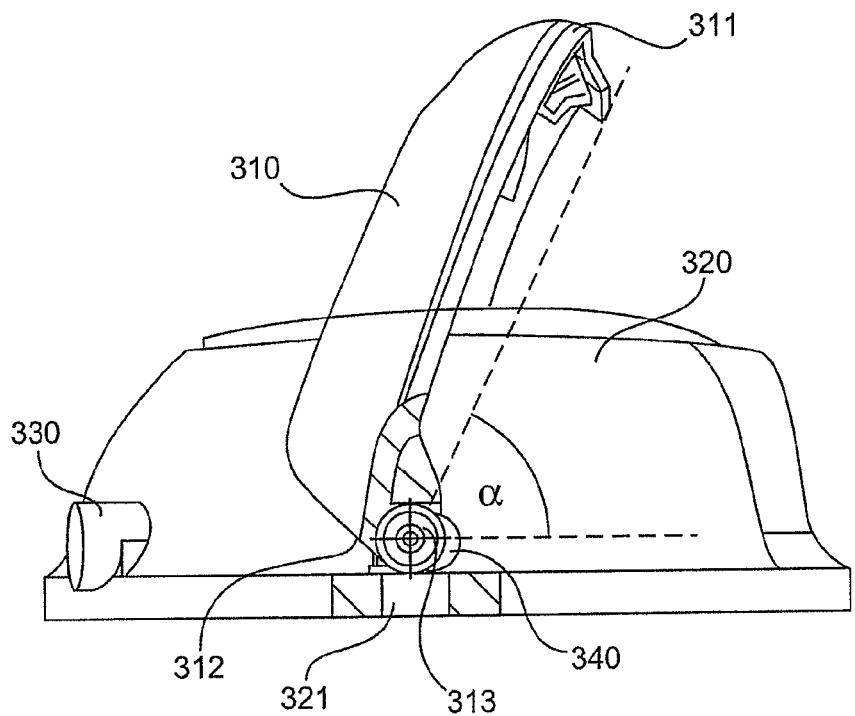
Figure 3B:
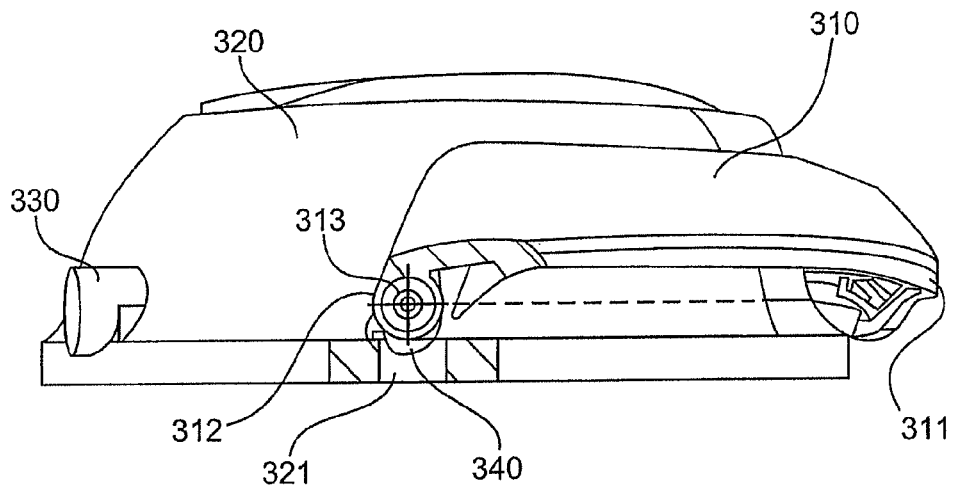
Figure 3C:
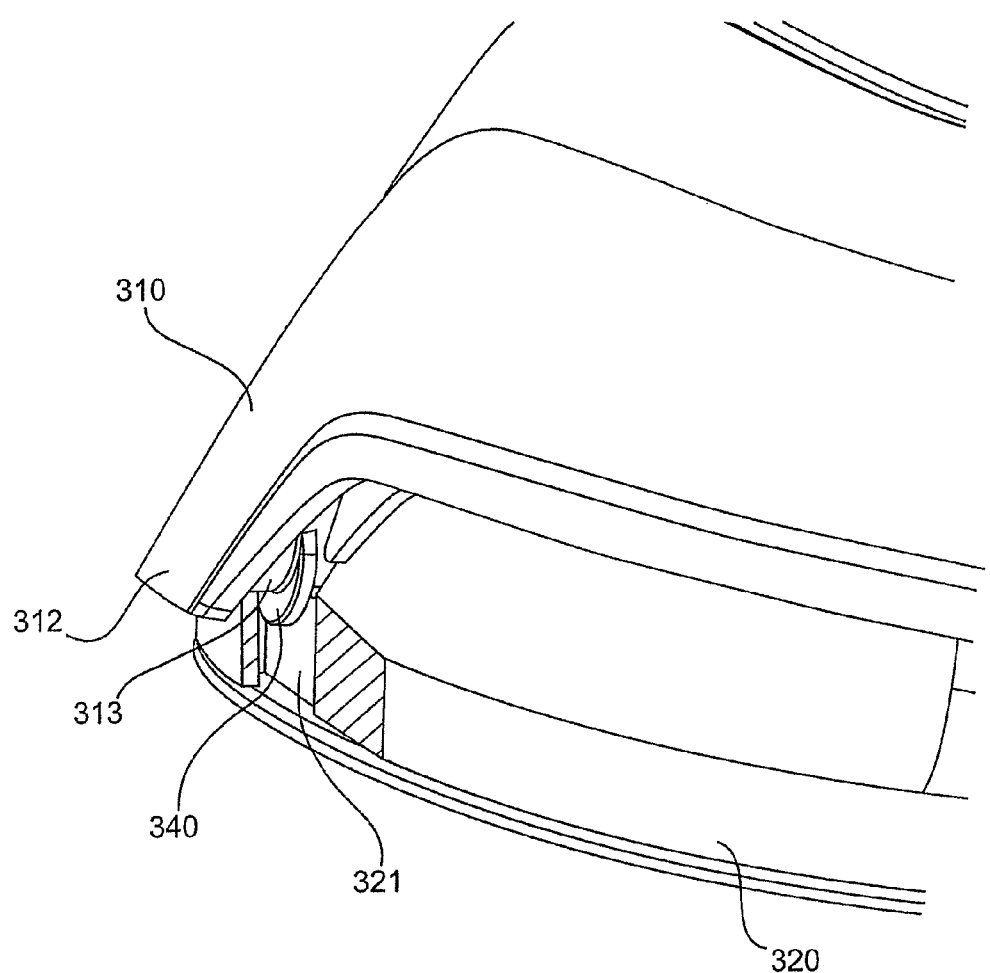
Figure 4:
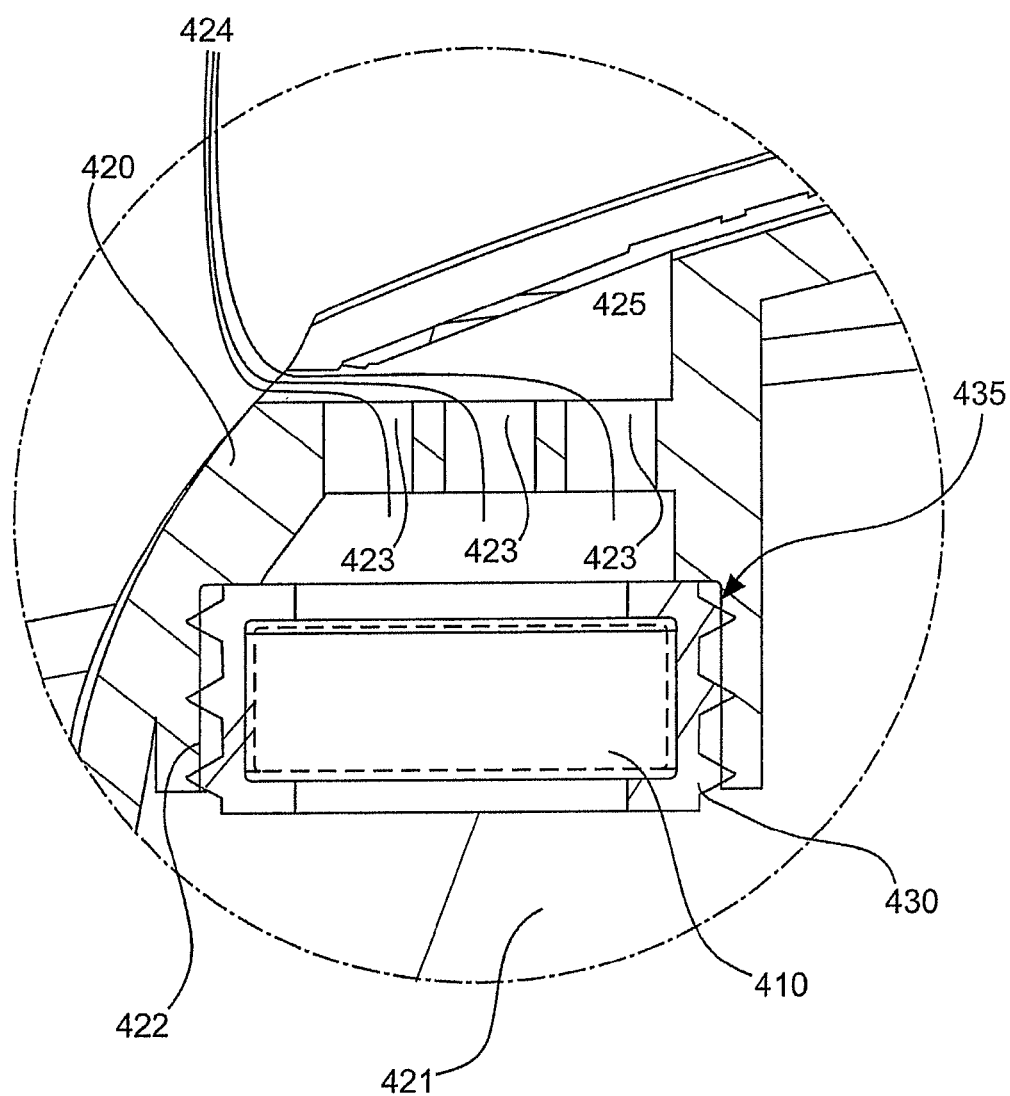
Figure 5A:
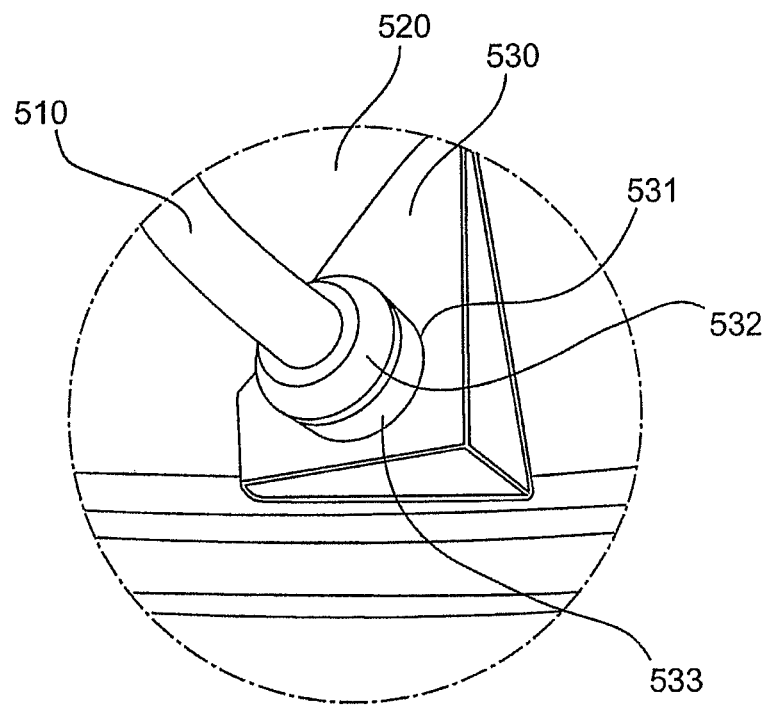
Figure 5B:
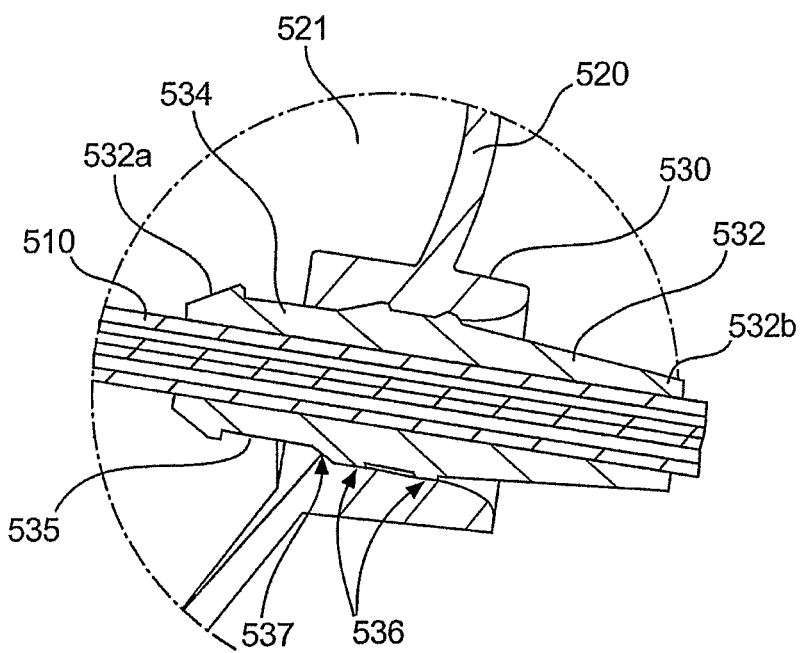
Figure 5C:
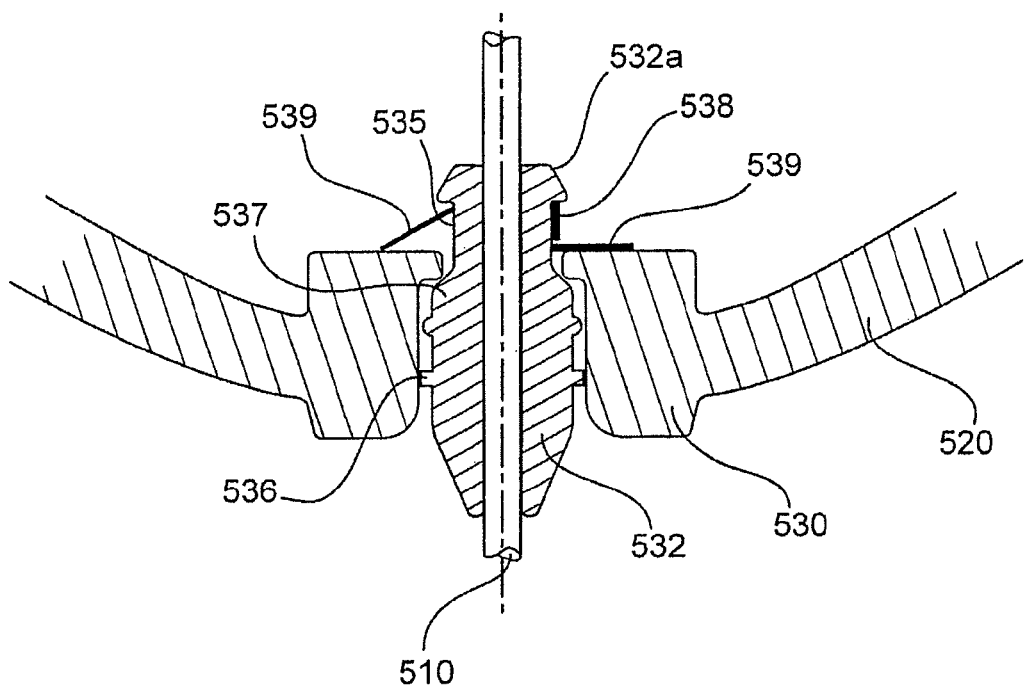
Figure 6:
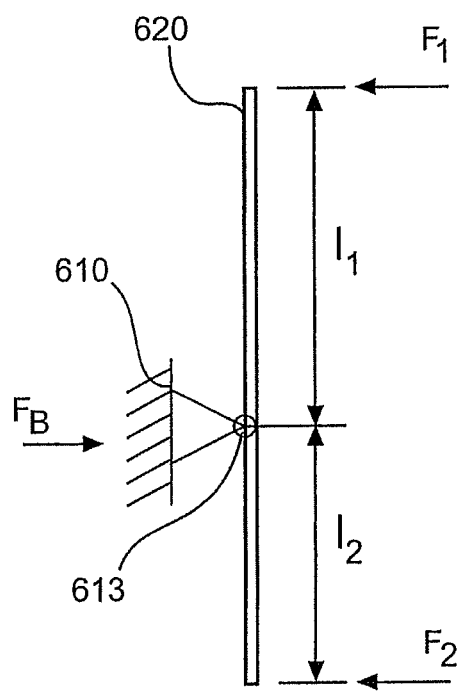
Figure 7A:
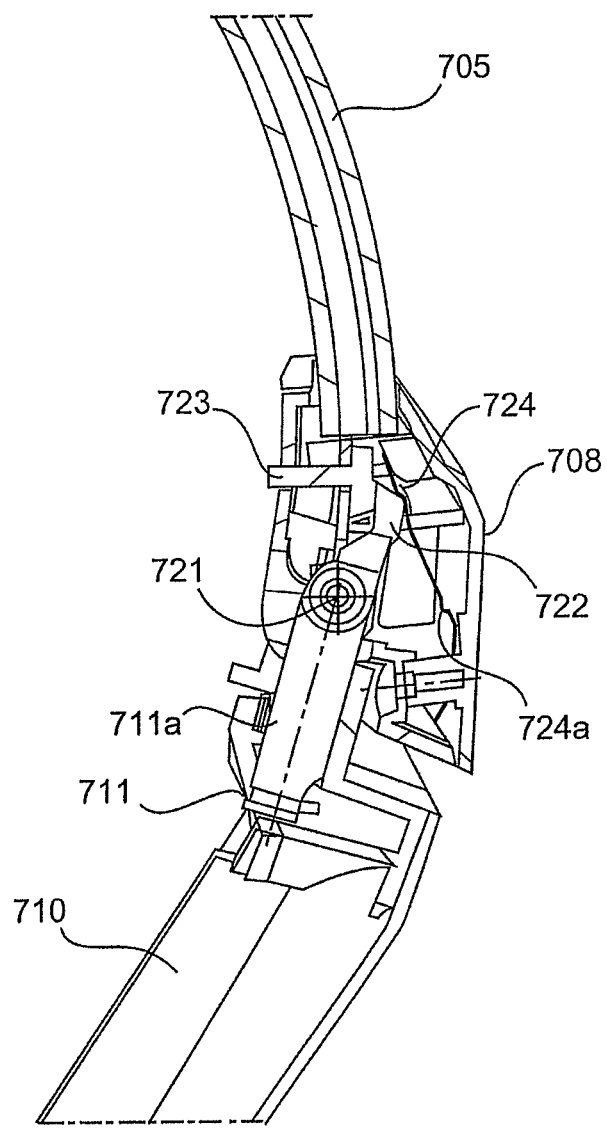
Figure 7B:
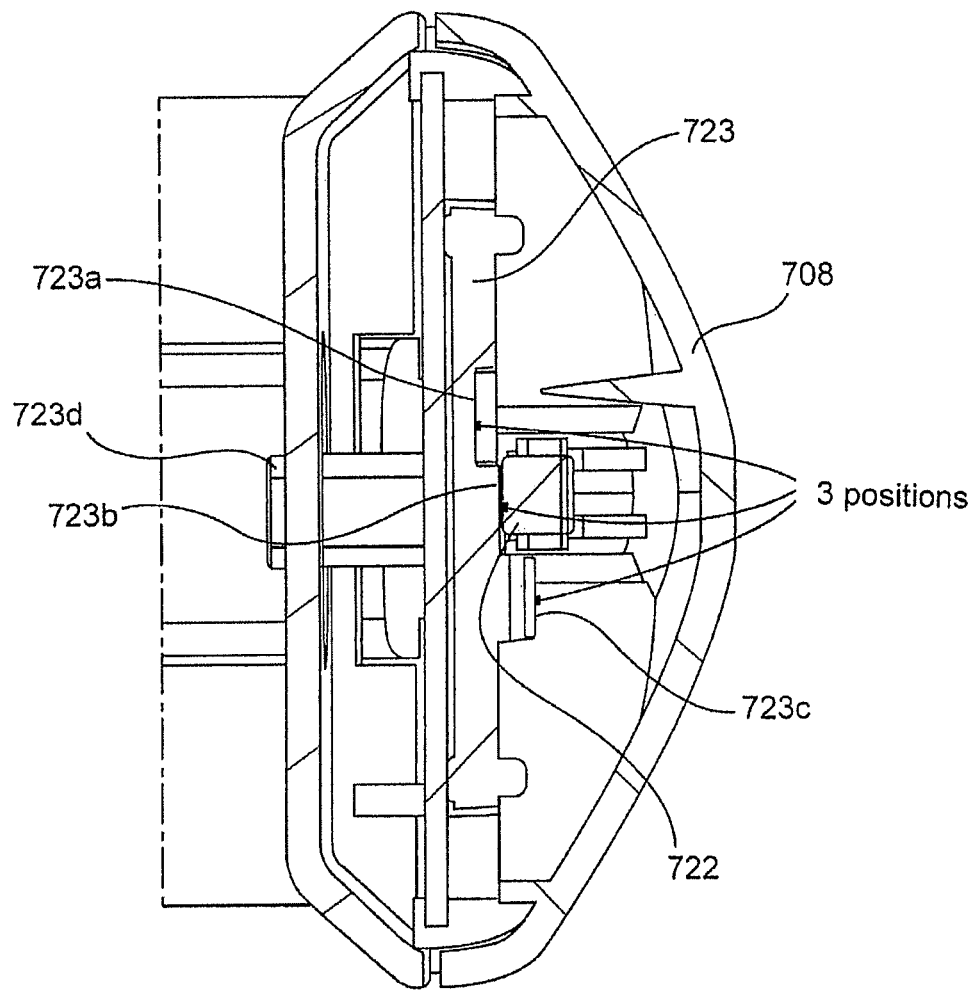
Figure 7C:
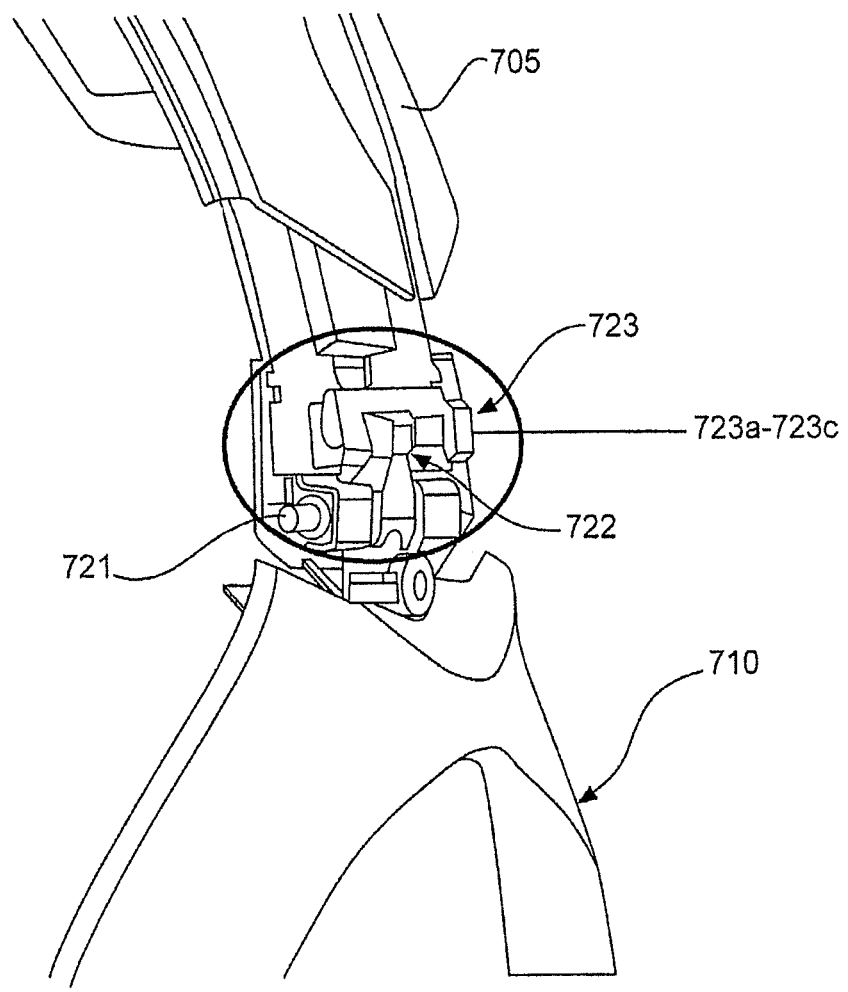
Figure 8A:
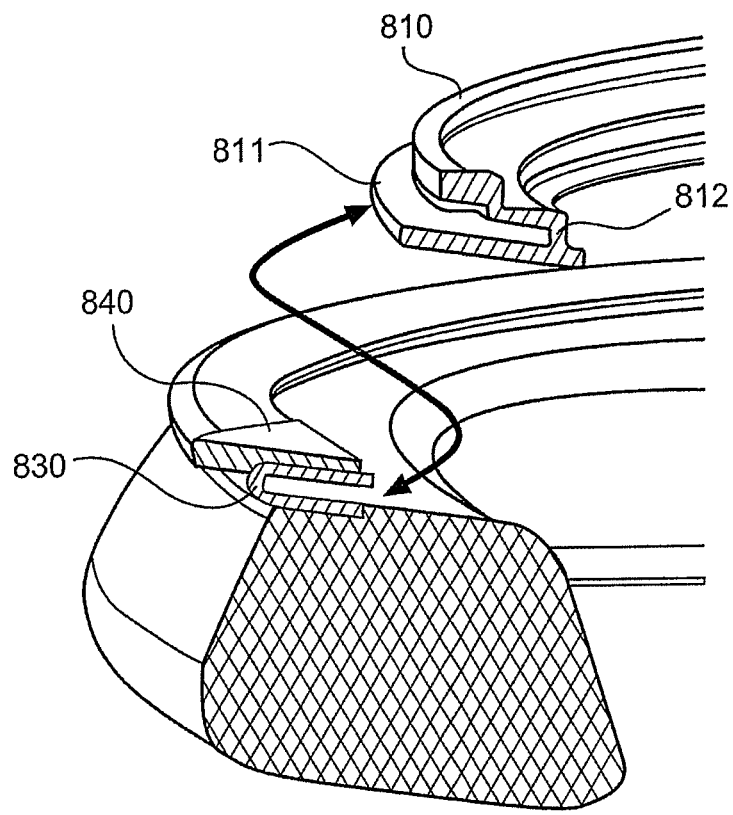
Figure 8B:
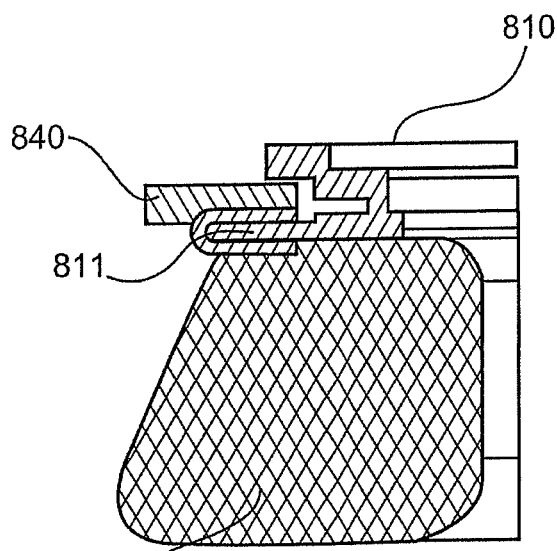

FIG. 1 shows a diagrammatic view of a headset in a first embodiment,

FIG. 2 shows a diagrammatic view of the inside of an earpiece for a headset or an earphone in accordance with a second embodiment, FIGS. 3A through 3C show various diagrammatic views of a fork and an earpiece of a headset or an earphone in accordance with a third embodiment, FIG. 4 shows a sectional view of an earpiece of a headset or an earphone in accordance with a fourth embodiment, FIGS. 5A through 5C show various views of an earpiece of a headset or an earphone in accordance with a fifth embodiment, FIG. 6 shows a diagrammatic view of a mounting of an earpiece in the case of an earphone or headset in accordance with a sixth embodiment, FIG. 7A shows a sectional view of a part of an earphone or headset in accordance with a seventh embodiment, FIG. 7B shows a further sectional view of a part of an earphone or headset as shown in FIG. 7A, FIG. 7C shows a perspective view of a part of an earphone or headset in accordance with the seventh embodiment, and FIGS. 8A and 8B show perspective sectional views of a part of an earphone or headset in accordance with an eighth embodiment.

FIG. 1 shows a diagrammatic view of a headset in accordance with a first embodiment. The headset 100 has a head band 105 and two earpieces 120 at the ends of the head band and optionally a boom microphone 106. The two earpieces or ear caps 120 represent housings and serve to receive an electroacoustic reproduction transducer and optionally a microphone, the signals of which can be used for active noise reduction. The earpieces 120 can each be fixed to the head band 105 by means of a respective fork 110. At least one of the two earpieces 120 can have a cable receiving portion 130 for receiving a cable. Ear pads 121 are fixed to the earpieces 120. The forks 110 can optionally also be connected to the head band 105 pivotably by way of a receiving portion 108.

FIG. 2 shows a diagrammatic view of the inside of an earpiece of an earphone or headset in accordance with a second embodiment. An acoustic wall 210 having an electroacoustic reproduction transducer 240, a microphone 220 and optionally a plurality of spokes 250 between the electroacoustic reproduction transducer 240 and the acoustic wall 210 can be provided in the earpiece 120. In this case the microphone 220 is arranged in front of the electroacoustic reproduction transducer, that is to say in the direction of the ear of a user when the headset or earphone is being worn. A cover element 230 for example in the form of a disk 230 can be provided between the microphone 220 and at least a part of the electroacoustic reproduction transducer. In that case the disk 230 is preferably larger than the microphone 220. The disk 230 serves to at least partially screen the microphone 220 from the useful sound of the electroacoustic reproduction transducer. The sound generated by the electroacoustic reproduction transducer 240 is only intended to impinge on the microphone 220 with a certain delay. In this case the microphone 220 can be used in particular as a microphone for active noise reduction. The sound generated by the electroacoustic reproduction transducer 240 is at least partially deflected away from the microphone by the cover element or the disk 230 so that the microphone detects in particular the interference sound which reaches the ear of a user and to a lesser degree the useful sound.

According to the invention the useful sound produced by the electroacoustic reproduction transducer is at least partially screened by the disk 230 so that the microphone can pick up predominantly the interference sound.

The ratio of the area of the microphone 220 to the area of the disk 230 is less than one and is in particular <0.8, in particular 0.25.

Thus there can be provided an earphone or a headset having a head band and at least one earpiece. The earpiece has at least one electroacoustic reproduction transducer 240, a microphone 220 and a cover element 230 for screening the microphone from the useful sound produced by the electroacoustic transducer 240, wherein the cover element 230 is provided at least partially between the electroacoustic reproduction transducer and the microphone 220. Optionally the cover element 230 can be in the form of a disk. Optionally the microphone 220 and the disk 230 can be arranged in front of the transducer. Optionally the area of the cover element 230 is larger than that of the microphone.

FIGS. 3A through 3C each show various views of an earpiece and a fork of an earphone or headset in accordance with a third embodiment. The headset or the earphone in accordance with the third embodiment can be based on the headset or earphone in accordance with the first embodiment. FIG. 3A shows a fork 310 and an earpiece 320 in a first operative position (unlocked). FIG. 3B shows the fork 310 and the earpiece 320 in a second operative position (locked). The fork 310 has a first end 311 and a second end 312. The first end 311 of the fork 310 is optionally pivotably secured to a head band of an earphone or headset. The second end 312 of the fork 310 is fixed to the earpiece 320 by way of a pivotal mounting 313. A locking member 340 is provided in the region of the second end 312 of the fork 310. In the region of the pivotal mounting 313 the earpiece 320 has a support 321 for receiving the locking member 340. FIG. 3A shows the fork 310 in a first operative position, in which case the locking member 340 does not engage into the support 321. The earpiece 320 can have a cable receiving portion 330 for receiving a cable. There is an angle α between the fork 310 and an end of the earpiece, as shown in FIG. 3a.

In FIG. 3B the fork 310 is connected at its second end 312 to the earpiece 320 by way of a pivotal mounting 313. FIG. 3A shows the fork 310 in the second operative position (locked). In that case the locking member 340 engages into the support 321 and the fork is thus locked in the earpiece or vice-versa.

FIG. 3C shows a portion on an enlarged scale of the fork around the earpiece in an earphone in accordance with the third embodiment. FIG. 3C shows the fork 310 with its second end 312 with the earpiece 320. The second end 312 of the fork 310 is connected to the earpiece 320 by way of a journal mounting 313 or a pivotal mounting. Provided at the second end 312 of the fork 310 is a locking member 340 which can engage into a support 321 on the earpiece 320. The operative position shown in FIG. 3C corresponds to the second operative position, that is to say the fork is locked in the earpiece.

The configuration of the fork and the earpiece in accordance with the third embodiment can guarantee a secure fit for the fork to the earpiece, in that case the earpiece volume remains closed and the locking action is independent of an acoustic wall within the earpiece.

The pivotal mounting 313 in the third embodiment can be for example in the form of a journal mounting, in that case an earpiece journal member engages therein and the earpiece 320 is thus mounted pivotably about the pivot axis.

To assemble the fork the fork can first be positioned at an angle (of for example 5°-80°) relative to the earpiece and the journal mountings can be successively fitted onto the earpiece journals. For that purpose it may be necessary for the fork to be slightly bent open. The earpiece can then be moved into an operative or useful position. That movement (from for example 70° to for example 0°) provides that the earpiece is locked to the fork or vice-versa.

Thus in accordance with a third embodiment there can be provided an earphone or a headset having a head band and at least one fork 310 at the end of the head band. A first end 311 of the fork 310 is fixed to the head band. A second end 312 of the fork 310 is connected to an earpiece 320 pivotably by way of a pivotal mounting 313. A locking member 340 is provided at the second end 312 of the fork. In the region of the pivot axis 313 the earpiece has a support 321 for receiving the locking member 340. In a first operative position there is an angle of >γ between the earpiece 320 and the fork 310. In that situation the locking member 340 does not engage into the support 321. In a second operative situation there is an angle of <γ between the earpiece 320 and the fork 310 so that the locking member 340 engages into the support 321 and the fork is locked to the earpiece. That angle can be between 5° and 80°.

FIG. 4 shows a sectional view of a part of an earphone or headset in accordance with a fourth embodiment. The headset in accordance with the fourth embodiment can be based on the headset or earphone in accordance with the first through third embodiments. In this case in particular a part of an earpiece 420 is shown. A microphone 410 can be fixed in or to the earpiece 420. In this case the microphone 410 is fixed to the earpiece 420 in such a way that it is mechanically decoupled from the earpiece and any influence of structure-borne sound on the microphone 410 can be reduced. The microphone 410 can serve for example to register interference sound for an active noise reduction unit. The earpiece 420 has a receiving portion 422 for receiving the microphone 410. A first end of the receiving portion 422 is connected to the internal earpiece volume 421. The second end of the receiving portion 422 has a plurality of holes 423. Those holes 423 can optionally open into a volume 425 which in turn is connected to the external volume by a duct or opening 422 at the outer housing of the earpiece 420. Alternatively the holes 423 can also be arranged directly on the outer housing of the earpiece 420 so that those holes 423 are directly in communication with the external volume. The microphone 410 can for example at least partially have a capsule mounting 430 at its periphery. The capsule mounting 430 is accommodated in the receiving portion 422. The capsule mounting 430 can have for example a number of ribs 435. The capsule mounting 430 is preferably in the form of a soft resilient elastomer. The receiving portion 422 can be for example in the form of a shaft. The fact that the capsule mounting 430 is in the form of an elastomer and the provision of the ribs 435 means that the microphone can be provided in structure-borne sound-decoupled relationship in the receiving unit 422.

The structure-borne sound-decoupling relationship in respect of the microphone of the headset, described in accordance with the fourth embodiment, can also be applied to other microphones of the headset in accordance with one of the embodiments of the invention.

In the fourth embodiment of the invention there can be provided an earphone or headset having at least one earpiece for receiving an electroacoustic reproduction transducer. The earpiece 420 has a receiving portion 422 for receiving a microphone 410. The microphone 410 is fixed in the receiving portion by means of a capsule mounting 430. The capsule mounting 430 of the microphone 410 has an elastic material so that the microphone is provided in the receiving unit in structure-borne sound-decoupled relationship. Optionally therefore the microphone at least partially projects into the internal region of the earpiece and can be used for recording interference sound in the interior of the earpiece. As an alternative thereto the microphone can also be so arranged that as an external microphone it records the external noises. Optionally the receiving portion 422 has at least one opening 423, the opening 423 being coupled to the external volume outside the earpiece. Optionally the at least one opening 423 can open into a volume 425 which in turn is coupled to the external volume by way of an opening 424.

The microphone 220 in the first embodiment in FIG. 2 can also optionally have an elastic capsule mounting in accordance with the second embodiment.

FIGS. 5A through 5C show various views of a part of an earpiece of an earphone or headset in accordance with a fifth embodiment. The headset or the earphone in accordance with the fifth embodiment can be based on a headset or earphone in accordance with one of the embodiments of the invention. FIG. 5A shows a part of an earpiece 520, a cable 510 and a cable receiving region 530 of the earpiece for receiving the cable 510. The receiving region 530 can for example partially project out of the earpiece. The receiving region can have for example a receiving bore 531, a cable sleeve or bushing 532 and for example a crimp region 533.

FIG. 5B shows a sectional view of the cable receiving region 530 of the earpiece 520. FIG. 5B shows the cable 510, the cable sleeve 532 and a receiving portion 530 as a cross-section. The cable insertion sleeve 532 has a first end 532a and a second end 532b. In this case the first end 532a projects into the internal volume 521 of the earpiece 520 while the second end 532b projects out of the earpiece 520. At its first end 532a the receiving portion 530 has a sealing cone 537. The cable sleeve 532 at its periphery can have a plurality of at least partially peripherally extending ribs 536.

A crimp portion 534 can be provided in the region of the first end 532a of the cable insertion sleeve 532.

The specific configuration of the cable insertion sleeve 532 can permit structure-borne sound decoupling. Structure-borne sound decoupling can be implemented by the ribs 536 at the outside diameter of the cable insertion sleeve 532. The sealing cone 537 can be used for sealing off the internal earpiece volume. In this case the sealing cone 537 can bear against a narrowed portion of the cable receiving portion 530. In this case the crimp portion 534 serves to receive a crimp ring to relieve the tensile load on the cable.

FIG. 5C shows a further alternative configuration of the cable sleeve in accordance with the fifth embodiment. The cable sleeve 532 can be for example injection molded onto the cable 510. The cable with the sleeve 532 can then be inserted into a receiving portion 530 of the earpiece 520. At its first end 532a the cable sleeve has a crimp portion 535. In the first alternative a disk 539 can be provided at the side of the receiving portion 530, that is towards the internal volume of the earpiece 521. A crimp ring 538 can then be crimped into the region of the crimp portion 535.

As an alternative thereto it is possible to provide a resilient fan-disk washer 539 in an angle on the crimp portion.

Thus, in accordance with the fifth embodiment, the sleeve 532 can be injection molded onto the cable before fitment of the cable. At the first end 532a of the sleeve 532 there can be a peripherally extending projection, the outside diameter of which is larger than the inside diameter of the receiving portion 530. Thus the first end of the sleeve does not readily pass through the receiving portion 530 and, when the sleeve is pulled into the hole of the receiving portion, the peripherally extending projection can be elastically deformed.

Preferably the hole of the receiving portion 530, at the side towards the internal earpiece volume 521, has a narrowing in its diameter. That narrowing can serve for example as an abutment for the first end or the sealing cone of the cable sleeve 532. The cable insertion can be sealed by the sealing cone 537 and the peripherally extending ribs 536. In that case, a force can be produced radially relative to the cable and peripherally, between the projections and the inside wall of the hole of the receiving portion. That can provide a secure sealing integrity.

FIG. 5C provides in particular two alternatives for relieving the tensile loading on the cable. In the first embodiment a cable can be pulled from the inside over a flat disk and then secured by means of a crimp ring in the crimp portion 535. In the second alternative, instead of the disk and the crimp ring, a resilient fan-disk washer can be pulled onto the cable from the inside. That fan-disk washer can then be pushed over a further projection on the sleeve so that the fan-disk washer is compressed when a pulling force is applied to the cable from the exterior and can prevent the cable from being pulled out.

An earphone or a headset in accordance with a fifth embodiment of the invention has an earpiece 520 and a receiving region for receiving a cable 510 in the earpiece. The cable 510 has a cable sleeve 532. The cable sleeve 532 has an at least partially peripherally extending sealing cone 537 and/or at least partially peripherally extending ribs 536. The receiving portion 530 has an opening with a narrowing configuration.

FIG. 6 shows a diagrammatic view of a mounting of an earpiece in an earphone or headset according to the sixth embodiment. FIG. 6 diagrammatically shows an earpiece 620. The earpiece 620 is connected to a fork 610 of which part is shown, by way of a pivot axis 613. The position of the pivot axis 613 divides the earpiece 620 into first and second portions, in the longitudinal direction of the earpiece. The length l1 of the first portion is in that case greater than the length l2 of the second portion. Thus the pivot axis 613 is not at the center of the longitudinal direction of the earpiece 620 but is arranged displaced further downwardly. That makes it possible to achieve improved adaptation of the earpiece and the ear pad to an ear of a user.

In accordance with the sixth embodiment the pivot axis for fixing the earpiece to the fork is provided in such a way that the force is optimally transmitted to the head of the user by way of an ear pad.

The earphone or headset according to the sixth embodiment can be based on an earphone or headset in accordance with one of the embodiments of the invention.

Thus in accordance with the sixth embodiment there can be provided an earphone or a headset having at least one fork and at least one earpiece, wherein the earpiece is fixed to the fork 610 pivotably about a pivot axis 613, the earpiece having a first portion of a first length and a second portion of a second length, wherein the position of the pivot axis divides the earpiece into the first and second portions. The length of the first portion is greater than the length of the second portion.

FIGS. 7A through 7C show various views of a portion of an earphone or headset in accordance with a seventh embodiment. The earphone or the headset in the seventh embodiment can be based on an earphone or headset in accordance with one of the embodiments of the invention. FIG. 7A shows a sectional view of the fork of the earphone or headset on the head band. The fork 710 is connected to the head band 705 by way of a receiving portion 708. A first end of the fork 710 has a portion 711a having a support element 722 and is coupled to a pivot axis 721. A leaf spring 724 is also provided in the receiving portion 708.

In that arrangement the leaf spring 724 serves to press the support element 722 against the slider 723 when the fork is pivoted open (operative position) and the headset is to be used. If however the fork is folded together again (rest position or transport position) in order to stow it then the support element 722 pivots in the clockwise direction in FIG. 7A and bears in the region of a nose 724a of the leaf spring thereagainst. The provision of the nose 724a can provide that the fork 710 does not itself move out of the rest position but is held in the rest position.

In the operative position the leaf spring serves as a kind of return spring and presses the support element 722 against the slider 723.

The leaf spring 724 is of such a configuration that the fork has to be folded together or folded out against the resistance of the leaf spring. In both cases the folding mechanism is in a condition of low stress and thus in a defined condition. In order to move out of the one position into the other it is necessary to pass beyond the dead-center point of the folding mechanism (the leaf spring).

A further spring is in the form of a spring bar of plastic material and latches with a nose in grooves or positions provided on the slider. In that way the slider can be prestressed for adjusting the angle of inclination of the fork. In that way the user can secure the selected setting of the head band contact pressure even after the fork has been folded together and folded out.

FIG. 7B shows a further sectional view (perpendicularly to the sectional view in FIG. 7A) of an earphone or headset in accordance with the seventh embodiment. FIG. 7B shows in particular the slider 723. In this case the slider 723 has for example three or more receiving positions 723a, 723b, 723c for the support element 722 of the fork 710. Alternatively the receiving positions can also be in the form of an inclined plane. The slider further has an actuating element 723d which projects out of the receiving unit 708. Upon displacement of the slider 723 the support element 722 can bear against one of the three positions 723a, 723b, 723c. In each of those three positions the fork is then at a different angle relative to the head band. Thus it is possible to adjust a head band contact pressure force for the headset in a simple fashion. Simply by displacing the slider 723 it is possible to select between three positions of the support unit 722 and thus the forks 710, in accordance with this seventh embodiment. The spacing between the earpieces fixed to the forks 710—in the rest condition—is increased or reduced by adjusting the angle of the fork 710.

FIG. 7C shows a diagrammatic perspective view of a part of an earphone or headset in accordance with the seventh embodiment. The housing of the receiving unit is not shown in FIG. 7C so that the inside of the receiving unit can be better seen. FIG. 7C thus shows a head band 705 and a fork 710 connected together by a receiving portion. The fork 710 is fixedly connected to the support element 722 and is pivotable about the pivot axis 721. The support element 722 can cooperate with the slider 723. The support element 722 can bear against various positions of the slider by actuation of the slider 723. Thus the angle between the fork 710 and the headphone band 705 can be adjusted by actuating the slider. In FIG. 7C the slider 723 is displaced entirely towards the right and the support element 722 bears against a first position of the slider 723.

The receiving portion 708 can have a cross-shaped component. The lower portion of the vertical bar of the cross-shaped component can be in the form of an axis to permit adaptation of the position of the earpiece (with the ear pad fixed thereto) to the head. The transverse bar of the cross-shaped component can also be in the form of an axis to permit for example horizontal inclination of the fork relative to the headphone. The upper part of the vertical bar serves for receiving and being supported on the slider 723. That serves for adjustment of the inclination of the fork with respect to the head band.

As an alternative to the seventh embodiment the pivot axis 721 can be displaceable to vary the spacing between the forks. In that way the head band contact pressure force can also be varied.

In accordance with a further embodiment as an alternative to the seventh embodiment pins of differing thickness can be used instead of the slider 723 to vary different angles of the fork with respect to the headphone band 705. In that way the spacing between the earpieces and thus the head band contact pressure force can also be varied.

In accordance with a further alternative to the seventh embodiment the support element 722 can be in the form of a spring plate. The hardness of the spring plate can be altered by an adjustable support point. In that way the deflection of the forks and thus the spacing between the earpieces can be determined by the spring force of the spring plate in accordance with the set support point.

FIGS. 8A and 8B show perspective sectional views of a part of a earphone or a headset in accordance with an eighth embodiment. In this respect the earphone or headset in accordance with the eighth embodiment can be based on one of the embodiments of the invention. FIG. 8A shows a part of an acoustic wall 810 or a receiving element for receiving an electroacoustic reproduction transducer of an earphone or headset. The acoustic wall or a part of the housing 810 has an at least partially peripherally extending groove 812 and a peripherally extending projection 811. FIG. 8A also shows an ear pad 820 which can be fixed to the acoustic wall or a part of the housing 810. At one side the ear pad 820 has a turned-over edge 830 and an insertion aid 840. The insertion aid 840 is preferably provided only at one location on the turned-over edge 830 and serves for improved insertion of the turned-over edge into the groove 812 of the acoustic wall 810.

FIG. 8B shows the ear pad and the acoustic wall in the assembled condition. In this case the projection 811 engages into the turned-over edge 830. The provision of the insertion aid 840 on the turned-over edge 830 of the ear pad 820 makes it possible to facilitate insertion of the projection 811 into the turned-over edge. That is particularly helpful as the ear pad is not of a round configuration. A recess into which the insertion aid 840 can be inserted can be provided in or at the acoustic wall. The insertion aid can preferably be harder than the turned-over edge so that the insertion aid 840 can be more easily inserted. Optionally the insertion aid may also be provided as a positioning aid in particular when dealing with earpieces which are not of a circularly symmetrical configuration.

In accordance with an eighth embodiment of the invention therefore there can be provided a headset or an earphone having at least one earpiece for receiving an electroacoustic reproduction transducer and an ear pad 820. The earpiece can have a receiving element for example for receiving an electroacoustic reproduction transducer, the receiving element having an at least partially peripherally extending projection 811. The ear pad 820 has an at least partially peripherally extending turned-over edge 830. In that case the turned-over edge 830 is of such a configuration that it can receive the projection 811. At least one insertion aid is provided on the turned-over edge to simplify insertion of the projection 811. The insertion aid is preferably made from a solid material. Optionally a recess can be provided on the projection 811 for receiving the insertion aid.

In accordance with a ninth embodiment of the invention which can be based on one of embodiments 1 through 8, there is provided an earphone or headset having at least one earpiece. One of the earpieces has a button for the signal of an active noise reduction unit. That can ensure simple operability in respect of active noise reduction. In addition it is possible to save on signal lines by virtue of a suitable selection of the position of the button.

In accordance with a ninth embodiment of the invention there is provided a headset or headphone having a head band. In that case the head band has a matrix of piezoelectric fibers which permit an adjustable contact pressure force. In that case the head band can comprise for example plastic material and can have integrated piezoelectric fibers. A steplessly variable electric voltage can be applied to the integrated piezoelectric fibers so that the piezoelectric fibers serve as an actuator and permit stressing or relief of stress of the matrix of the embedded piezoelectric fibers. When there is a steplessly variable electric voltage it is also possible to permit a steplessly adjustable contact pressure force. In other words, it is possible in that way to permit stepless adjustability of the head band contact pressure force.

Optionally the matrix with the embedded piezoelectric fibers can be provided at least partially in or on the head band.

Optionally an operating element can be provided on the earphone or headset for adjusting the desired head band contact pressure force by adjustment of a corresponding electric voltage.

The invention claimed is:

1. A headset comprising:
a head band;
at least one fork having a top end and a bottom end, the top end including a support element, and the bottom end of the fork for receiving an earpiece;
a receiving portion configured to pivotally couple the top end of the fork to the headband on a pivot axis, the pivot axis being perpendicular to a plane formed by the headband, and the receiving portion including a slider having at least two receiving,
wherein the support element engages into one of the at least two receiving positions of the slider, each of the at least two receiving positions configured to position the at least one fork at a different angle relative to the headband.

2. A headset as set forth in claim 1 wherein the support element is fixedly connected to the fork.

3. A headset as set forth in claim 1 wherein the at least two receiving positions of the slider limit different maximum deflections of the fork.

4. A headset as set forth in claim 1 wherein the slider at least partially projects out of the receiving portion.

5. A headset as set forth in claim 1,
wherein the earpiece has at least one electroacoustic reproduction transducer, a microphone and a cover element for screening the microphone from the useful sound produced by the electroacoustic reproduction transducer,
wherein the cover element is at least partially provided between the electroacoustic reproduction transducer and the microphone.

6. A headset as set forth in claim 1, wherein a locking member is provided at the bottom end of the fork,
wherein in the region of the pivot axis the earpiece has a support for receiving the locking member, wherein in a first operative position the locking member at the bottom end of the fork does not engage into the support, wherein in a second operative position the locking member engages into the support and locks the fork to the earpiece.

7. A headset as set forth in claim 1 wherein the earpiece has a receiving portion for receiving a microphone, wherein the microphone is fixed in the receiving portion by means of a capsule mounting, wherein the capsule mounting has an elastic material so that the microphone is provided in the receiving unit in structure-borne sound-decoupled relationship.

8. A headphone or earphone comprising:

a head band;

at least one fork having a top end and a bottom end, the top end including a support element and the bottom end for receiving an earpiece; and a receiving portion configured to pivotally couple the top end of the fork to the head band on a pivot axis, the pivot axis being perpendicular to a plane formed by the head band, and the receiving portion including a slider having at least two receiving positions, wherein the support element engages into one of the at least two receiving positions of the slider, each of the at least two receiving positions configured to position the fork at a different angle relative to the head band.

9. A headset comprising:

a head band;

a fork having a top end and a bottom end, the top end including a support element;

an earpiece coupled to the bottom end of the fork; and a receiving portion configured to pivotally couple the top end of the fork to the headband on a pivot axis, the pivot axis being perpendicular to a plane formed by the headband, and the receiving portion including a slider having at least two receiving positions, wherein the support element of the fork bears against one of the at least two receiving positions of the slider, each of the at least two receiving positions configured to position the fork at a different angle relative to the headband.

* * * * *

UNITED STATES PATENT AND TRADEMARK OFFICE
CERTIFICATE OF CORRECTION

| | | |
|---|---|---|
| PATENT NO. | : 8,559,665 B2 | Page 1 of 1 |
| APPLICATION NO. | : 13/020629 | |
| DATED | : October 15, 2013 | |
| INVENTOR(S) | : Schmidt et al. | |

It is certified that error appears in the above-identified patent and that said Letters Patent is hereby corrected as shown below:

In the Claims:

In column 10, line 42, claim 1, after "receiving," please insert --positions,--.

In column 10, line 48, claim 2, please insert a --,-- after "claim 1".

In column 10, line 50, claim 3, please insert a --,-- after "claim 1".

In column 10, line 53, claim 4, please insert a --,-- after "claim 1".

In column 10, lines 59-60, claim 5, after "transducer," please insert --and--.

In column 10, line 66, claim 6, delete "wherein in the region of the pivot axis the" and please insert --wherein, in the region of the pivot axis, the--.

In column 11, line 1, claim 6, delete "wherein in a first operative position the" and please insert --wherein, in a first operative position, the--.

In column 11, line 3, claim 6, after "support," please insert --and--.

In column 11, line 4, claim 6, delete "wherein in a second operative position the" and please insert --wherein, in a second operative position, the--.

In column 11, line 7, claim 7, please insert a --,-- after "claim 1".

In column 11, line 10, claim 7, after "mounting," please insert --and--.

In column 11, line 13, claim 7, after "structure-borne" please insert a --,--.

Signed and Sealed this
Eighteenth Day of February, 2014

Michelle K. Lee
*Deputy Director of the United States Patent and Trademark Office*